United States Patent
Kanzaki

(10) Patent No.: US 9,683,662 B2
(45) Date of Patent: Jun. 20, 2017

(54) SEALING DEVICE

(71) Applicant: NOK CORPORATION, Tokyo (JP)

(72) Inventor: Go Kanzaki, Fukushima (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 14/760,341

(22) PCT Filed: Jun. 21, 2013

(86) PCT No.: PCT/JP2013/067040
§ 371 (c)(1),
(2) Date: Jul. 10, 2015

(87) PCT Pub. No.: WO2014/112137
PCT Pub. Date: Jul. 24, 2014

(65) Prior Publication Data
US 2016/0003357 A1   Jan. 7, 2016

(30) Foreign Application Priority Data

Jan. 21, 2013 (JP) .................................. 2013-008116

(51) Int. Cl.
*F16J 15/00* (2006.01)
*F16J 15/3232* (2016.01)
(Continued)

(52) U.S. Cl.
CPC ......... *F16J 15/002* (2013.01); *F16C 33/7876* (2013.01); *F16C 33/805* (2013.01);
(Continued)

(58) Field of Classification Search
CPC ... F16C 33/7876; F16C 33/805; F16J 15/447; F16J 15/002; F16J 15/3232; F16J 15/3256
See application file for complete search history.

(56) References Cited

U.S. PATENT DOCUMENTS 4,819,949 A    4/1989  Otto
6,953,193 B2 * 10/2005 Kanzaki ............... F16C 19/186
                                                         277/549
(Continued)

FOREIGN PATENT DOCUMENTS

CN    102046994 A    5/2011
EP      0301731 A2    2/1989
(Continued)

OTHER PUBLICATIONS

Extended European Search Report for Application No. EP 13 87 2112 dated Jan. 11, 2016 (6 pages).

*Primary Examiner* — Kristina Fulton
*Assistant Examiner* — Eugene G Byrd
(74) *Attorney, Agent, or Firm* — Harness, Dickey & Pierce, P.L.C.

(57) ABSTRACT

The invention provides a sealing device having a sliding lip and a labyrinth lip, wherein the sealing device can inhibit the lip from being deformed as the lip even if the labyrinth lip is exposed to the foreign material in the machine outside and is swollen, thereby making the sliding lip protecting function hard to be lost. In order to achieve the object, in a sealing device having a sliding lip which seals so as to prevent foreign material in a machine outside from entering into a machine inside, and a labyrinth lip which makes the foreign material hard to reach the sliding lip, a notch portion for absorbing swelling of the labyrinth lip when the labyrinth lip is exposed to the foreign material and is swollen is provided in a leading end portion of the labyrinth lip.

2 Claims, 3 Drawing Sheets

(51) Int. Cl.
*F16C 33/78* (2006.01)
*F16C 33/80* (2006.01)
*F16J 15/447* (2006.01)
*F16C 19/18* (2006.01)

(52) U.S. Cl.
CPC ......... *F16J 15/3232* (2013.01); *F16J 15/447* (2013.01); *F16C 19/184* (2013.01)

(56) References Cited

U.S. PATENT DOCUMENTS

| | | | | |
|---|---|---|---|---|
| 7,677,577 | B2* | 3/2010 | Kanzaki | F16J 3/041 |
| | | | | 277/551 |
| 8,136,818 | B2* | 3/2012 | Yamanaka | F16J 15/324 |
| | | | | 277/424 |
| 8,231,129 | B2* | 7/2012 | Kobayashi | F16C 33/7876 |
| | | | | 277/346 |
| 8,714,563 | B2* | 5/2014 | Yamamoto | F16J 15/025 |
| | | | | 277/549 |
| 2007/0147718 | A1* | 6/2007 | Takimoto | F16C 33/7886 |
| | | | | 384/486 |
| 2010/0247014 | A1* | 9/2010 | Ohmori | F16C 19/186 |
| | | | | 384/486 |
| 2012/0007316 | A1* | 1/2012 | Terasawa | F16C 33/7876 |
| | | | | 277/361 |

FOREIGN PATENT DOCUMENTS

| | | |
|---|---|---|
| JP | H06-037626 U | 5/1994 |
| JP | 2005-121102 A | 5/2005 |
| JP | 2005-163815 A | 6/2005 |
| JP | 2008-039066 A | 2/2008 |
| JP | 2008-151174 A | 7/2008 |
| JP | 2010-071323 A | 4/2010 |
| JP | 2012-131452 A | 7/2012 |

* cited by examiner

PRIOR ART

SEALING DEVICE

CROSS REFERENCE TO RELATED APPLICATIONS

This application is a 371 U.S. National Stage Application of International Application No. PCT/JP2013/067040, filed on Jun. 21, 2013 and published in Japanese as WO/2014/112137 on Jul. 24, 2014. This application claims priority to Japanese Application No. 2013-008116, filed on Jan. 21, 2013. The entire disclosures of the above applications are incorporated herein by reference.

BACKGROUND OF THE INVENTION

Field of the Invention

The present invention relates to a sealing device, and more particularly to a sealing device having a sliding lip and a labyrinth lip. The sealing device according to the present invention is used, for example, as a hub bearing seal for a vehicle such as a motor vehicle, or is used as the other bearing seals (including the seal which is used for an industrial bearing).

Description of the Conventional Art

In the case that external foreign material (disturbance factor) such as water, muddy water, salt water, dust, brake fluid or oil is attached to a seal lip of a hub bearing seal which is installed to a bearing, the lip deforms by swelling of the rubber, and a sealing performance of the lip is lowered, in the conventional hub bearing seal. As a result, the conventional hub bearing has a defect that it is highly likely that the foreign material enters into the bearing.

In order to dissolve the defect mentioned above, there has been conventionally proposed a hub bearing seal which is provided with a sliding lip 71 sealing so as to prevent the foreign material in a bearing external portion (a machine outside) A from entering into a bearing internal portion (a machine inside) B, is provided with a labyrinth lip 72 in the machine outside A side of the sliding lip 71, and is structured such that the foreign material in the machine outside A is hard to reach the sliding lip 71 by the labyrinth lip 72, as shown in FIG. 3. According to the prior art in FIG. 3, since the swelling and deformation of the sliding lip 71 is suppressed at such a degree that the foreign material in the machine outside A is hard to reach the sliding lip 71, it is possible to improve the sealing performance. The labyrinth lip 72 is structured such that a labyrinth seal is formed by setting a micro gap in relation to the other member as its name suggests, and is constructed as a non-contact type lip in this manner so as to prevent a sliding torque from being increased by adding the lip.

However, in the prior art in FIG. 3, since the labyrinth lip 72 is exposed to the foreign material in the machine outside A in place of the sliding lip 71, the labyrinth lip 72 is swollen and deformed, and there is a risk that its function is lost in an early stage (the function is a function of protecting the sliding lip 71 by making the foreign material in the machine outside A hard to reach the sliding lip 71, this function being hereinafter called as "sliding lip protecting function" or simply called as "function").

SUMMARY OF THE INVENTION

Problem to be Solved by the Invention

The present invention is made by taking the above points into consideration, and an object of the present invention is to provide a sealing device having a sliding lip and a labyrinth lip, wherein the sealing device can inhibit the lip from being deformed as the lip even if the labyrinth lip is exposed to the foreign material in the machine outside and is swollen, thereby making the sliding lip protecting function hard to be lost.

Means for Solving the Problem

In order to achieve the object mentioned above, a sealing device according to a first aspect of the present invention is a sealing device having a sliding lip which seals so as to prevent foreign material in a machine outside from entering into a machine inside, and a labyrinth lip which makes the foreign material hard to reach the sliding lip, wherein a notch portion for absorbing swelling of the labyrinth lip when the labyrinth lip is exposed to the foreign material and is swollen is provided in a leading end portion of the labyrinth lip.

Further, a sealing device according to a second aspect of the present invention is the sealing device described in the first aspect mentioned above, wherein a second labyrinth lip is provided in the machine inside side of the labyrinth lip.

Further, a sealing device according to a third aspect of the present invention is the sealing device described in the second aspect mentioned above, wherein the same notch portion is provided in a leading end portion of the second labyrinth lip.

Further, a sealing device according to a fourth aspect of the present invention is the sealing device described in the third aspect mentioned above, wherein the notch portion provided in the leading end portion of the labyrinth lip and the notch portion provided in the second labyrinth lip are arranged so as to be displaced circumferentially.

Further, a sealing device according to a fifth aspect of the present invention is the sealing device described in the first, second, third or fourth aspect mentioned above, wherein the sealing device is used as a hub bearing seal for a vehicle such as a motor vehicle or the other bearing seals.

In the sealing device according to the present invention having the structure mentioned above, since the notch portion is provided in the leading end portion of the labyrinth lip, the notch portion absorbs the swelling in the case that the labyrinth lip is exposed to the foreign material in the machine outside and is swollen. In other words, the notch portion acts as a shelter for the swelling. Therefore, since the labyrinth lip is inhibited from being deformed as the lip even if the labyrinth lip is swollen, the sealing function is maintained. As a result, the sliding lip protecting function is maintained.

In the case that the notch portion is provided in the leading end portion of the labyrinth lip as mentioned above, there is a possibility that the foreign material enters from the notch portion and an entering amount of the foreign material is increased, however, there is an idea that the second labyrinth lip is provided in the machine inside side of the labyrinth lip for preventing the possibility. In other words, a plurality of labyrinth lips are preferably provided. According to this structure, since the second labyrinth lip seals the foreign material entering from the notch portion, it is possible to inhibit the entering amount of the foreign material from being increased.

Further, in this case, the swelling can be absorbed in the second labyrinth lip by the provision of the same notch portion in the leading end portion of the second labyrinth lip. As a result, it is possible to maintain the sealing function and the sliding lip protecting function.

Further, in the case that the notch portion is provided in the second labyrinth lip as mentioned above, the foreign material passing through the notch portion provided in the labyrinth lip can reach the notch portion provided in the second labyrinth lip only by moving circumferentially if the notch portion in the labyrinth lip and the notch portion provided in the second labyrinth lip are arranged so as to be displaced circumferentially. As a result, the foreign material is hard to reach the sliding lip. Therefore, a labyrinth space to which the foreign material is hard to enter is formed, and it is accordingly possible to improve the sealing function of the sealing device.

Effect of the Invention

The present invention achieves the following effects.

More specifically, in the present invention, the sealing device is provided with the sliding lip which seals so as to prevent the foreign material in the machine outside from entering into the machine inside, and the labyrinth lip which makes the foreign material in the machine outside from reaching the sliding lip, and the notch portion is provided in the leading end portion of the labyrinth lip among them, as mentioned above. As a result, in the case that the labyrinth lip is exposed to the foreign material in the machine outside and is swollen, the notch portion absorbs the swelling and acts as the shelter for the swelling. Therefore, since the labyrinth lip is inhibited from being deformed as the lip even if the labyrinth lip is swollen, the sealing function is maintained, and the sliding lip protecting function is accordingly maintained. Accordingly, as initially intended in the present invention, it is possible to inhibit the labyrinth lip from being deformed as the lip even if the labyrinth lip is exposed to the foreign material in the machine outside and is swollen in the sealing device having the sliding lip and the labyrinth lip. As a result, it is possible to provide the sealing device structured such that the sliding lip protecting function is hard to be lost.

Further, it is possible to inhibit the entering amount of the foreign material from being increased by the provision of the second labyrinth lip in the machine inside side of the labyrinth lip, and it is possible to absorb the swelling of the second labyrinth lip so as to maintain the sealing function and the sliding lip protecting function by the provision of the same notch portion in the leading end portion of the second labyrinth lip. Further, since the labyrinth space to which the foreign material is hard to enter is formed by arranging the notch portion which is provided in the leading end portion of the labyrinth lip and the notch portion which is provided in the second labyrinth lip so as to be displaced circumferentially, it is possible to improve the sealing function of the sealing device.

Further, in the hub bearing seal for the vehicle such as the motor vehicle, there has been developed in recent years a technique of employing a rubber material obtained by blending a conductive carbon such as Ketjen black or acetylene black as a lip material, as a static electricity removal measure (a radio noise measure). However, the rubber material obtained by blending the conductive carbon has a property that the material tends to be swollen and deformed after immersion into the muddy water or the salt water, in comparison with the rubber material to which the conductive carbon is not blended. On the contrary, since the swelling resistance of the labyrinth lip is enhanced as mentioned above in the sealing device according to the present invention, the sealing device is suitable for being used under condition that the sealing device is exposed to the muddy water and the salt water. As a result, according to the present invention, it is possible to provide the sealing device which is preferably used as the hub bearing seal particularly for the vehicle such as the motor vehicle.

BRIEF EXPLANATION OF THE DRAWINGS

FIGS. 1A and 1B are views showing a sealing device according to a first embodiment of the present invention, in which FIG. 1A is a cross sectional view of a substantial part thereof, and FIG. 1B is an enlarged view of a portion C in FIG. 1A;

FIGS. 2A and 2B are views showing a sealing device according to a second embodiment of the present invention, in which FIG. 2A is a cross sectional view of a substantial part thereof, and FIG. 2B is a view as seen from an arrow D in FIG. 2A.

DETAILED DESCRIPTION OF PREFERRED EMBODIMENTS

The following embodiments are included in the present invention.

(1) The present invention relates to a lip deformation preventing method of a hub bearing seal (a hub seal).

(2) In a combination of a sliding lip and a labyrinth lip which is arranged in a machine outside of the sliding lip, since a clearance (a notch) in a peripheral direction is provided by attaching the notch in the labyrinth lip even in the case that the swelling is formed, it is possible to prevent the deformation.

(3) The deformation can be prevented by the structure in the item (2) mentioned above, however, since there may be a possibility that the entering amount of the water, the muddy water, the salt water and the dust from the notch is increased, the increase of the entering amount is prevented by the provision of the additional lip in the inner side of the notch.

(4) According to the present invention, the labyrinth effect can be maintained by preventing the deformation of the labyrinth lip, the sealing performance is not lowered by sufficiently protecting the sliding lip, and it is possible to lower the possibility that the foreign material such as the water enters into the bearing.

EMBODIMENTS

Next, a description will be given of embodiments according to the present invention with reference to the accompanying drawings.

Sealing devices according to the embodiments mentioned below are all used as a hub bearing seal (a hub seal) in a bearing portion in an automotive wheel suspension device, and prevent an external foreign material (a disturbance factor) such as water, muddy water, salt water, dust, brake fluid or oil in a bearing external portion (a machine outside) A from entering into a bearing internal portion (a machine inside) B and prevent lubrication grease in the bearing internal portion B from leaking to the bearing external portion A.

First Embodiment

Figure 1A:
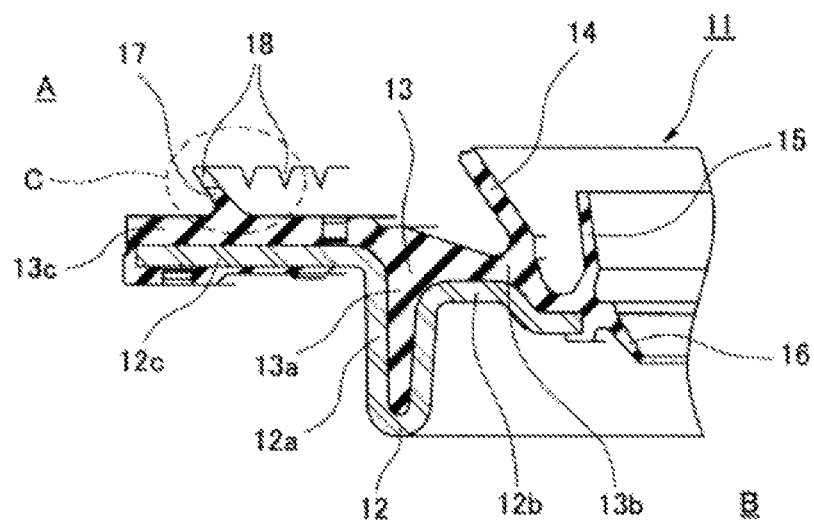
Figure 1B:
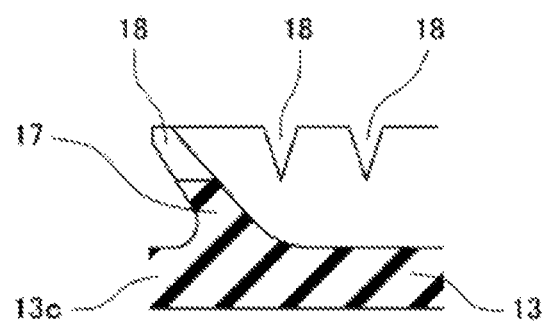

A sealing device 11 shown in FIG. 1 is provided with sliding lips 14 and 15 which seal so as to prevent the foreign material in the machine outside A from entering into the machine inside B, and a labyrinth lip 17 which makes the foreign material in the machine outside A hard to reach the sliding lips 14 and 15, and a notch portion 18 is provided in a leading end portion of the labyrinth lip 17 for absorbing swelling when the labyrinth lip 17 is exposed to the foreign material in the machine outside A and is swollen. The sliding lips 14 and 15 are provided in the machine inside side of the labyrinth lip 17, and the labyrinth lip 17 is provided in the machine outside side of the sliding lips 14 and 15.

The sealing device 11 is constructed by a metal ring (an attaching ring) 12, and a rubber-like elastic body 13 which is attached (vulcanization bonded) to the metal ring 12.

Figure 3:
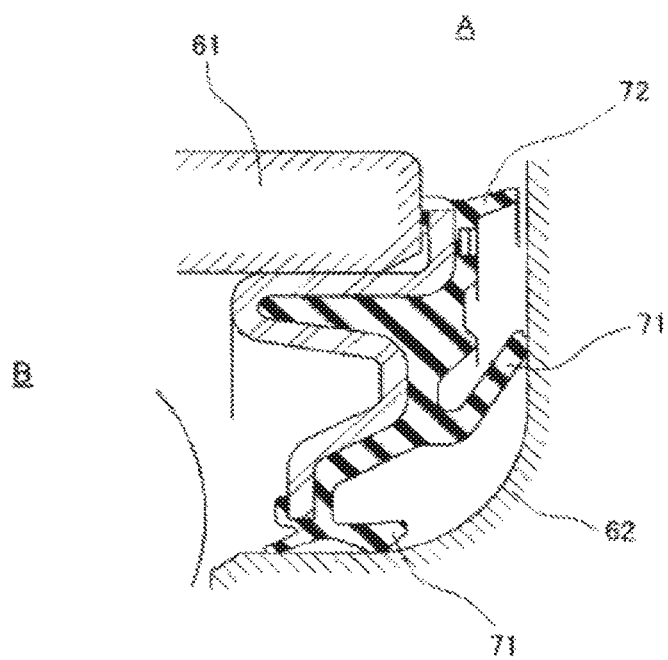
FIG. 3 is a cross sectional view of a substantial part of a sealing device according to a prior art.

The metal ring 12 is provided with a tubular portion 12a which is fitted to an inner peripheral surface of an outer race (a housing) 61 (refer to FIG. 3) in the bearing portion, and is structured such that a first folded portion 12b is integrally formed in an end portion in a machine inside side of the tubular portion 12a toward an inner side in a diametrical direction, and a second folded portion 12c is integrally formed in an end portion in a machine outside side of the tubular portion 12a toward an outer side in the diametrical direction.

The rubber-like elastic body 13 is integrally provided with a first attached portion 13a which is attached to the tubular portion 12a of the metal ring 12, a second attached portion 13b which is attached to the first folded portion 12b, and a third attached portion 13c which is attached to the second folded portion 12c. The first sliding lip (the side lip) 14, the second sliding lip (the radial lip) 15 and a grease lip 16 are integrally formed in the second attached portion 13b in the rubber-like elastic body 13. The sliding lips 14 and 15 seal so as to prevent the foreign material in the machine outside A from entering into the machine inside B by slidably coming into close contact with a rotary member 62 (refer to FIG. 3) such as an inner race or a rotary shaft in the bearing portion, and the grease lip 16 seals so as to prevent grease in the machine inside B from leaking to the machine outside A. The labyrinth lip 17 is integrally formed in the third attached portion 13c, and makes the foreign material in the machine outside A hard to reach the sliding lips 14 and 15 by setting a micro gap in relation to the rotary member 62 so as to form a labyrinth seal.

Further, a lot of notch portions 18 are circumferentially provided in a leading end portion of the labyrinth lip 17. As a result, it is possible to absorb the swelling when the labyrinth lip 17 is exposed to the foreign material in the machine outside A and is swollen. More specifically, the rubber-like elastic body 13 forming the labyrinth lip 17 swells so as to contract an opening area of the notch portion 18 and a whole of the labyrinth lip 17 (a whole shape as the seal lip) is accordingly made hard to be deformed.

In the sealing device 11 having the structure mentioned above, there are provided the sliding lips 14 and 15 which seal so as to prevent the foreign material in the machine outside A from entering into the machine inside B, and the labyrinth lip 17 which makes the foreign material in the machine outside A hard to reach the sliding lips 14 and 15, and the notch portion 18 is provided in the leading end portion of the labyrinth lip 17 among these lips. As a result, in the case that the labyrinth lip 17 is exposed to the foreign material in the machine outside A and is swollen, the notch absorbs the swelling and acts as a shelter of the swelling. Therefore, since the labyrinth lip 17 is inhibited from being deformed as the lip even after being swollen, the sealing function is maintained, and the sliding lip protecting function is accordingly maintained. As a result, it is possible to maintain the sealing function by the sliding lips 14 and 15 over the long term, and it is possible to improve the sealing performance of the sealing device 11.

Second Embodiment

Figure 2A:
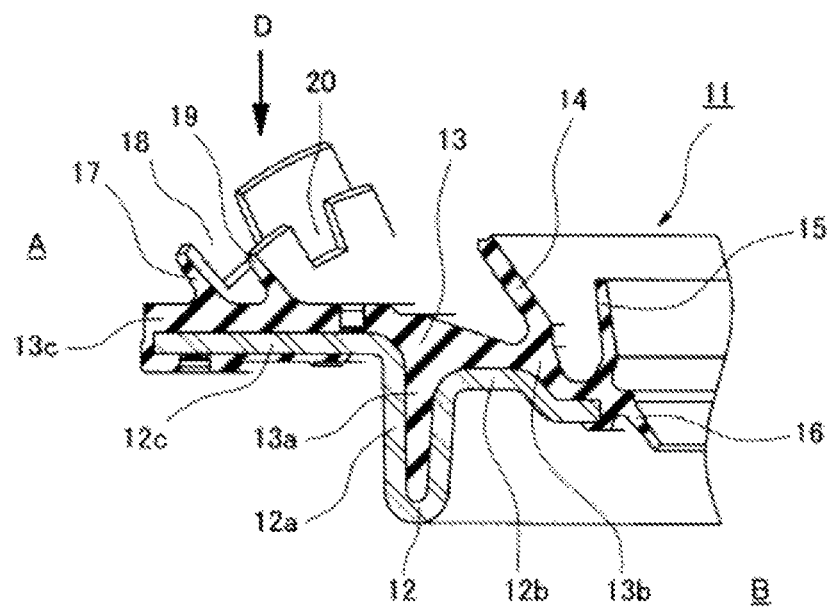

A sealing device 11 shown in FIG. 2 is provided with sliding lips 14 and 15 which seal so as to prevent the foreign material in the machine outside A from entering into the machine inside B, and a labyrinth lip 17 which makes the foreign material in the machine outside A hard to reach the sliding lips 14 and 15, and a notch portion 18 is provided in a leading end portion of the labyrinth lip 17 for absorbing swelling when the labyrinth lip 17 is exposed to the foreign material in the machine outside A and is swollen. FIG. 2A shows a cross section of a substantial part of the sealing device 11, however, the sliding lips 14 and 15 are drawn together in its state (perspective view) when looking down at the sliding lips 14 and 15 from a diagonally upward direction.

The sealing device 11 is constructed by a metal ring (an attaching ring) 12, and a rubber-like elastic body 13 which is attached (vulcanization bonded) to the metal ring 12.

The metal ring 12 is provided with a tubular portion 12a which is fitted to an inner peripheral surface of an outer race (a housing) 61 (refer to FIG. 3) in the bearing portion, and is structured such that a first folded portion 12b is integrally formed in an end portion in a machine inside side of the tubular portion 12a toward an inner side in a diametrical direction, and a second folded portion 12c is integrally formed in an end portion in a machine outside side of the tubular portion 12a toward an outer side in the diametrical direction.

The rubber-like elastic body 13 is integrally provided with a first attached portion 13a which is attached to the tubular portion 12a of the metal ring 12, a second attached portion 13b which is attached to the first folded portion 12b, and a third attached portion 13c which is attached to the second folded portion 12c. The first sliding lip (the side lip) 14, the second sliding lip (the radial lip) 15 and a grease lip 16 are integrally formed in the second attached portion 13b in the rubber-like elastic body 13. The sliding lips 14 and 15 seal so as to prevent the foreign material in the machine outside A from entering into the machine inside B by slidably coming into close contact with a rotary member 62 (refer to FIG. 3) such as an inner race or a rotary shaft in the bearing portion, and the grease lip 16 seals so as to prevent grease in the machine inside B from leaking to the machine outside A. The labyrinth lip 17 is integrally formed in the third attached portion 13c, and makes the foreign material in the machine outside A hard to reach the sliding lips 14 and 15 by setting a micro gap in relation to the rotary member 62 so as to form a labyrinth seal.

Further, a lot of notch portions 18 are circumferentially provided in a leading end portion of the labyrinth lip 17. As a result, it is possible to absorb the swelling when the labyrinth lip 17 is exposed to the foreign material in the machine outside A and is swollen. More specifically, the rubber-like elastic body 13 forming the labyrinth lip 17 swells so as to contract an opening area of the notch portion 18 and a whole of the labyrinth lip 17 (a whole shape as the seal lip) is accordingly made hard to be deformed.

Further, a second labyrinth lip 19 is integrally provided in a machine inside side, that is, an inner peripheral side of the labyrinth seal 17, and a lot of notch portions 20 are circumferentially provided in a leading end portion of the second labyrinth lip 19.

Figure 2B:
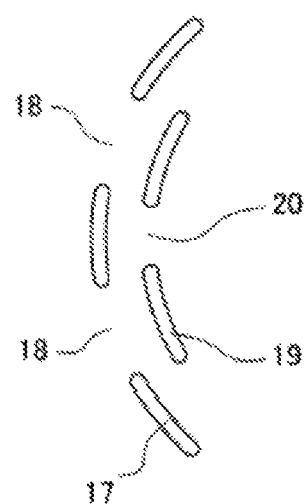

Further, as shown in FIG. 2B, the notch portions 18 provided in the leading end portion of the labyrinth lip 17 and the notch portions 20 provided in the second labyrinth lip 19 are arranged so as to be circumferentially displaced.

In the sealing device 11 having the structure mentioned above, there are provided the sliding lips 14 and 15 which seal so as to prevent the foreign material in the machine outside A from entering into the machine inside B, and the labyrinth lip 17 which makes the foreign material in the machine outside A hard to reach the sliding lips 14 and 15, and the notch portion 18 is provided in the leading end portion of the labyrinth lip 17 among these lips. As a result, in the case that the labyrinth lip 17 is exposed to the foreign material in the machine outside A and is swollen, the notch absorbs the swelling and acts as a shelter of the swelling. Therefore, since the labyrinth lip 17 is inhibited from being deformed as the lip even after being swollen, the sealing function is maintained, and the sliding lip protecting function is accordingly maintained. As a result, it is possible to maintain the sealing function by the sliding lips 14 and 15 over the long term, and it is possible to improve the sealing performance of the sealing device 11.

Further, since the second labyrinth lip 19 is provided in the machine inside side of the labyrinth lip 17, it is possible to inhibit the entering amount of the foreign material from being increased. Further, since the notch portion 20 is provided in the leading end portion of the second labyrinth lip 19, it is possible to absorb the swelling of the second labyrinth lip 19 and it is possible to maintain the sealing function and the sliding lip protecting function.

Further, since the notch portions 18 provided in the leading end portion of the labyrinth lip 17 and the notch portions 20 provided in the second labyrinth lip 19 are arranged so as to be displaced circumferentially, a labyrinth space to which the foreign material is hard to enter is formed between both the lips 17 and 19. Therefore, since the foreign material is hard to pass through the labyrinth space, the sealing performance of the sealing device 11 is improved.

As a common feature between the embodiments, in the hub bearing seal for the vehicle such as the motor vehicle, there has been developed in recent years the technique of employing the rubber material (the conductive rubber material) obtained by blending a conductive carbon such as Ketjen black or acetylene black as a lip material, as a static electricity removal measure (a radio noise measure). However, the rubber material (the conductive rubber material) obtained by blending the conductive carbon has a property that the material tends to be swollen and deformed after immersion into the muddy water or the salt water, in comparison with the rubber material (the non-conductive rubber material) to which the conductive carbon is not blended. On the contrary, since the swelling resistance of the labyrinth lip 17 is enhanced as mentioned above in the sealing device 11 according to the present invention, the sealing device is suitable for being used under condition that the sealing device is exposed to the muddy water and the salt water. As a result, according to the present invention, it is possible to provide the sealing device 11 which is preferably used as the hub bearing seal particularly for the vehicle such as the motor vehicle.

Further, the present invention enhances the swelling resistance of the labyrinth lip 17 by the provision of the notch portions 18 in the leading end portion of the labyrinth lip 17, however, since there exists in the rubber material (the conductive rubber material) obtained by blending the conductive carbon the characteristic that the rubber material tends to swell and deform after the immersion into the muddy water or the salt water, in comparison with the rubber material (the non-conductive rubber material) to which the conductive carbon is not blended as mentioned above, there is an idea that the swelling resistance of the labyrinth lip 17 is enhanced by executing a two-color formation of forming the labyrinth lip 17 by the rubber material (the non-conductive rubber material) to which the conductive carbon is not blended or a material (a low-conductive rubber material) having a lower conductivity than the sliding lips 14 and 15 as well as forming the sliding lips 14 and 15 by the rubber material (the conductive rubber material) to which the conductive carbon is blended. As a result, it is possible to further enhance the swelling resistance of the labyrinth lip 17 by the provision of the notch portion 18 in the leading end portion of the labyrinth lip 17 after the execution of the two-color formation mentioned above.

What is claimed is:

1. A sealing device comprising:
    an elastic body formed of a material that is configured to swell upon exposure to water, the elastic body including a sliding lip which seals so as to prevent the water in a machine outside from entering into a machine inside; and
    a first labyrinth lip which makes the water hard to reach the sliding lip,
    wherein a first notch portion for absorbing swelling of the first labyrinth lip when the first labyrinth lip is exposed to the water and is swollen is provided in a first leading end portion of the first labyrinth lip,
    a second labyrinth lip is provided at a machine inside side of the first labyrinth lip,
    a second notch portion is provided in a second leading end portion of the second labyrinth lip, and
    the first notch portion provided in the first leading end portion of the first labyrinth lip and the second notch portion provided in the second labyrinth lip are arranged so as to be offset from each other.

2. The sealing device according to claim 1, wherein the sealing device is used as a hub bearing seal for a vehicle such as a motor vehicle.

\* \* \* \* \*